(12) United States Patent
Mickalewski et al.

(10) Patent No.: US 9,601,767 B2
(45) Date of Patent: Mar. 21, 2017

(54) ALKALINE COLLECTOR ANODE

(75) Inventors: Carl Mickalewski, Appleton, WI (US); John Mccord, Appleton, WI (US); Joseph Sarazin, DePere, WI (US); Rob Biersteker, Hilbert, WI (US)

(73) Assignee: Luvata Appleton LLC, Appleton, WI (US)

( * ) Notice: Subject to any disclaimer, the term of this patent is extended or adjusted under 35 U.S.C. 154(b) by 444 days.

(21) Appl. No.: 13/292,257

(22) Filed: Nov. 9, 2011

(65) Prior Publication Data

US 2012/0121984 A1 May 17, 2012

Related U.S. Application Data

(60) Provisional application No. 61/414,704, filed on Nov. 17, 2010.

(51) Int. Cl.
| | | |
|---|---|---|
| H01M 2/32 | (2006.01) |
| H01M 4/66 | (2006.01) |
| H01M 4/38 | (2006.01) |
| H01M 10/24 | (2006.01) |
| C22C 1/02 | (2006.01) |
| C22C 9/02 | (2006.01) |
| C22C 9/04 | (2006.01) |

(52) U.S. Cl.
CPC ............. *H01M 4/38* (2013.01); *C22C 1/02* (2013.01); *C22C 9/02* (2013.01); *C22C 9/04* (2013.01); *H01M 2/32* (2013.01); *H01M 4/662* (2013.01); *H01M 10/24* (2013.01); *Y02E 60/124* (2013.01); *Y02P 70/54* (2015.11)

(58) Field of Classification Search
CPC .. H01M 4/24; H01M 2/32; H01M 4/66–4/662
USPC .......................... 429/220, 229, 211, 233, 245
See application file for complete search history.

(56) References Cited

U.S. PATENT DOCUMENTS

| | | | |
|---|---|---|---|
| 4,207,391 A | 6/1980 | Church et al. |
| 4,632,890 A | 12/1986 | Wang |
| 4,791,036 A * | 12/1988 | Schrenk ............... H01M 4/661 420/490 |
| 4,822,562 A | 4/1989 | Miyafuji et al. |
| 4,992,343 A * | 2/1991 | Nardi .............................. 429/57 |
| 5,112,705 A | 5/1992 | Hunter et al. |
| 5,164,274 A | 11/1992 | Kordesch et al. |
| 5,242,511 A | 9/1993 | Yokoyama et al. |
| 5,882,442 A | 3/1999 | Caron et al. |
| 6,132,528 A | 10/2000 | Brauer et al. |
| 7,081,235 B2 | 7/2006 | Feddrix et al. |
| 7,132,197 B2 | 11/2006 | Miyaki |
| 7,229,717 B2 | 6/2007 | Yamaguchi et al. |
| 7,553,586 B2 | 6/2009 | Shimamura et al. |
| 7,632,605 B2 | 12/2009 | Guo et al. |
| 7,771,872 B2 | 8/2010 | Tanoue et al. |
| 2002/0197531 A1 | 12/2002 | Inoue et al. |
| 2003/0211387 A1 | 11/2003 | Braunger et al. |
| 2003/0215717 A1 | 11/2003 | Miyaki et al. |
| 2004/0140022 A1 | 7/2004 | Inohana et al. |
| 2005/0170244 A1 | 8/2005 | Tamakoshi et al. |
| 2006/0210877 A1 | 9/2006 | Manko et al. |
| 2007/0141466 A1 | 6/2007 | Shimamura et al. |
| 2007/0148551 A1 | 6/2007 | Murakami et al. |
| 2008/0155813 A1 | 7/2008 | Dopp et al. |
| 2008/0226976 A1 | 9/2008 | Stimits |
| 2009/0162745 A1 | 6/2009 | Iwamoto et al. |
| 2009/0165902 A1 | 7/2009 | Yoshida et al. |
| 2009/0220861 A1 | 9/2009 | Yamaguchi |
| 2009/0263272 A1 | 10/2009 | Uchida |
| 2011/0206941 A1 | 8/2011 | Koehler et al. |

FOREIGN PATENT DOCUMENTS

| | | |
|---|---|---|
| CN | 101171700 | 4/2008 |
| CN | 101649475 | 5/2010 |
| EP | 1508625 | 2/2005 |
| EP | 2088214 | 8/2009 |
| GB | 988868 | 4/1965 |
| JP | S6199644 | 5/1986 |
| JP | S6459769 | 3/1989 |
| JP | H05311288 | 11/1993 |

(Continued)

OTHER PUBLICATIONS

Machine Translation of JP H08-222193 to Yamazaki et al. 1996.*
International Search Report and Written Opinion for Application No. PCT/US2011/059871 dated May 16, 2012 (6 pages).
Chinese Patent Office Action for Application No. 201180064657.9 dated Jun. 17, 2015 (4 pages, English translation included).
Chinese Patent Office Action for Application No. 201180064657.9 dated Jan. 29, 2015 (11 pages—English translation included).
Taiwan Patent Office Action for Application No. 100142126 dated Sep. 4, 2015 (10 pages, English translation included).
Chinese Patent Office Action for Application No. 201180064657.9 dated Oct. 16, 2015 (11 pages, English translation included).
European Patent Office Action for Application No. 11842214.6 dated Jul. 5, 2016 (8 pages).
European Patent Office Extended Search Report for Application No. 11842214.6 dated Sep. 29, 2016 (26 pages).

*Primary Examiner* — Jonathan G Leong
(74) *Attorney, Agent, or Firm* — Michael Best & Friedrich LLP

(57) ABSTRACT

An alkaline battery includes a cathode, an alkaline electrolyte, and a copper-based anode which reduces hydrogen gassing without a protective coating or plating to less than 50% of the gas production observed using tin-plated 260 brass. An alloy for an anode which reduces hydrogen gassing without a protective coating or plating to less than 50% of the gas production observed using tin-plated 260 brass includes 0.01% to 9.0% tin, no more than 1% of phosphorus, no more than 1% of incidental elements and impurities, and the balance copper, in wt %. Another alloy for an anode which reduces hydrogen gassing without a protective coating or plating to less than 50% of the gas production observed using tin-plated 260 brass includes 1.0% to 40% zinc, about 0.01% to 5.0% tin, no more than 1% of phosphorus, no more than 1% of incidental elements and impurities, and the balance copper, in wt %.

1 Claim, No Drawings

(56) References Cited

FOREIGN PATENT DOCUMENTS

| | | |
|---|---|---|
| JP | 8222193 | 8/1996 |
| JP | H08-222194 | 8/1996 |
| JP | 2000-178670 | 6/2000 |
| JP | 2007039735 | 2/2007 |
| WO | 2010/049118 | 5/2010 |

\* cited by examiner

ALKALINE COLLECTOR ANODE

CROSS-REFERENCE TO RELATED APPLICATIONS

This application claims the benefit of priority to U.S. Provisional Application Ser. No. 61/414,704, filed Nov. 17, 2010 which is incorporated by reference herein.

TECHNICAL FIELD

The disclosure relates generally to batteries, and more particularly to alkaline batteries including a cathode, a current-collecting anode, and an alkaline electrolyte. The disclosure further relates to copper-based alloys that are useful for an anode.

BACKGROUND

A battery commonly includes an anode, a cathode, and an electrolyte. Batteries having an alkaline electrolyte are known to be prone to hydrogen gassing. The hydrogen gas may be generated by corrosion of the current-collecting anode material. Excessive gassing can be undesirable since it can cause the cell to vent and leak the alkaline electrolyte, which reduces the shelf life and safety of the batteries during storage and/or use. To reduce gassing, a protective coating or plating can be applied to the anode. However, this processing can be costly and there is a need to further reduce electrode gassing, preferably without the introduction of a protective coating or plating.

SUMMARY

To reduce hydrogen gassing in batteries employing a copper-based anode, the copper-based anode can be plated with tin or other elements similar to tin which are suitable for coating or plating. However, the plating layer is typically less than 5 μm in thickness and prone to defects such as pinholes, unplated surfaces and cracks. Hydrogen can then be generated from those defects, rendering the plating ineffective. Thus, there is a need for an anode material which can reduce hydrogen gassing without a protective coating or plating.

In one embodiment, the invention provides an alkaline battery including a cathode, an alkaline electrolyte, and a copper-based anode which reduces hydrogen gassing without a protective coating or plating to less than 50% of the gas production observed using tin-plated 260 brass.

In another embodiment, the invention provides an alloy for a battery anode which reduces hydrogen gassing without a protective coating or plating to less than 50% of the gas production observed using tin-plated 260 brass, including 0.01% to 9.0% tin, no more than 1% of phosphorus, no more than 1% of incidental elements and impurities, and the balance copper, in wt %.

In a further embodiment, the invention provides an alloy for a battery anode which reduces hydrogen gassing without a protective coating or plating to less than 50% of the gas production observed using tin-plated 260 brass, including 1.0% to 40% zinc, 0.01% to 5.0% tin, no more than 1% of phosphorus, no more than 1% of incidental elements and impurities, and the balance copper, in wt %.

Other aspects of the invention will become apparent by consideration of the following detailed description.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways.

In some embodiments, compositions described herein that recite tin also encompass and include similar elements such as indium as a substitute for tin in whole or in part.

Aspects of the invention relate to a battery including a cathode, a copper-based anode, and an alkaline electrolyte that reduces hydrogen gassing. In some embodiments, the cathode can be made out of manganese dioxide, nickel oxide, silver oxide, and the like. The alkaline electrolyte can be made from commonly known solutions in the art such as ammonium chloride or potassium hydroxide. In some embodiments, the battery is rechargeable.

In some embodiments, the anode is made of a copper-based alloy with 0.01% to 9.0% tin, no more than 1% of phosphorus, no more than 1% of incidental elements and impurities, and the balance copper, all of which are expressed in wt %; unless otherwise indicated, all percentages shown in the present application are expressed as percent by weight ("wt %"). In other embodiments, the anode is made of a copper-based alloy with 0.01% to 9.0% tin, 0.001% to 0.500% phosphorus, no more than 0.5% of incidental elements and impurities, and the balance copper, in wt %. In yet other embodiments, the anode is made of a copper-based alloy with 4.2% to 5.8% tin, no more than 1% of phosphorus, no more than 0.1% of incidental elements and impurities, and the balance copper, in wt %; in still other embodiments, the copper-based alloy has no more than 5.8% tin, no more than 5.5% tin, no more than 5.2% tin, no more than 4.9% tin, no more than 4.6% tin, no more than 4.3% tin, no more than 4.0% tin, no more than 3.7% tin, no more than 3.4% tin, no more than 3.1% tin, no more than 2.9% tin, no more than 2.6% tin, no more than 2.3% tin, no more than 2.0% tin, no more than 1.7% tin, no more than 1.4% tin, no more than 1.1% tin, no more than 0.8% tin, no more than 0.5% tin, or no more than 0.2% tin; in yet other embodiments, the copper-based alloy has at least 0.01% tin, at least 0.1% tin, at least 0.3% tin, at least 0.5% tin, at least 0.6% tin, at least 0.7% tin, at least 0.8% tin, at least 0.9% tin, at least 1.0% tin, at least 1.2% tin, at least 1.5% tin, at least 1.8% tin, at least 2.0% tin, at least 2.1% tin, at least 2.4% tin, at least 2.5% tin, at least 2.7% tin, at least 3.0% tin, at least 3.3% tin, at least 3.5% tin, at least 3.6% tin, at least 3.7% tin, at least 3.8% tin, at least 3.9% tin, at least 4.0% tin, or at least 4.1% tin. Incidental elements and impurities in the disclosed alloys may include aluminum, antimony, arsenic, calcium, iron, lithium, manganese, silicon, silver, titanium, zinc, zirconium, or mixtures thereof and may be present in the alloys disclosed herein in amounts totaling no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%. The addition of phosphorus in the disclosed alloys may be helpful to improve properties of the alloy including its fluidity for casting.

In other embodiments, the anode is made of a copper-based alloy with 1.0% to 40% zinc, 0.01% to 5.0% tin, no more than 1% of phosphorus, no more than 1% of incidental elements and impurities, and the balance copper, in wt %. In still other embodiments, the anode is made of a copper-based alloy with 1.0% to 40% zinc, 0.05% to 3.0% tin, 0.001% to 0.100% phosphorus, no more than 0.5% of incidental elements and impurities, and the balance copper, in wt %. In still other embodiments, the copper-based alloy has no more than 40.0% zinc, no more than 39.0% zinc, no more than 38.0% zinc, no more than 37.0% zinc, no more than 36.0% zinc, no more than 35.0% zinc, no more than 34.0% zinc, no more than 33.0% zinc, no more than 32.0% zinc, no more than 31.0% zinc, or no more than 30.0% zinc; in yet other embodiments, the copper-based alloy has at least 1.0% zinc, at least 5.0% zinc, at least 10.0% zinc, at least 15.0% zinc, at least 20.0% zinc, at least 22.0% zinc, at least 24.0% zinc, at least 26.0% zinc, at least 28.0% zinc, at least 30.0% zinc, at least 31.0% zinc, at least 32.0% zinc, at least 33.0% zinc, at least 34.0% zinc, at least 35.0% zinc, at least 36.0% zinc, at least 37.0% zinc, at least 38.0% zinc, or at least 39.0% zinc. This includes a copper-based alloy with 20% to 40% zinc, 0.5% tin, no more than 1% of incidental elements and impurities, and the balance copper, in wt %. In further embodiments, the anode is made of a copper-based alloy with 7.1% to 10.7% zinc, 0.3% to 0.7% tin, 0.001% to 0.100% phosphorus, no more than 0.1% of incidental elements and impurities, and the balance copper, in wt %.

The disclosed alloys can be used as battery anode material, without the addition of a protective coating or plating. The nominal composition of 260 brass is approximately 30% zinc, and no more than 0.07% lead, no more than 0.05% iron, and the balance copper; and the nominal composition of Si-bronze is approximately 1.8% silicon, no more than 1.5% zinc, no more than 0.8% iron, no more than 0.7% manganese, no more than 0.05% lead, and the balance copper. Compared to these alloys in the plated condition, the unplated anodes of the disclosed alloys can reduce the gassing at the current-collecting anode to less than half. The disclosed alloys are also generally formable, and demonstrate the required resistance for welding techniques known in the art such as spot welding and butt welding. Furthermore, the disclosed alloys demonstrate good ductility to allow subsequent processing to a final form, can be produced into a smooth surface, and are able to carry current.

The anode of the disclosed battery can be produced by conventional processing techniques known to persons skilled in the art. In some embodiments, the alloys can be cast to a near-net shape anode. In other embodiments, the anode can be produced by powder metallurgy techniques. In still other embodiments, the anode can be produced by forging, wire drawing, or strip manufacturing. In the various exemplary alloys disclosed herein, each element of the recited compositions preferably includes a variance in the range of plus or minus ten percent of the nominal value.

EXAMPLES

Following are specific examples of the invention. In these examples, the alloy melts were continuously cast, rolled, annealed, and drawn into a wire form following industry recognized best practices. The wire was subjected to a shaving or scalping process known in the art to remove contaminants. Reduction in gassing is dependent on a clean, non-contaminated surface. Shaving or scalping is a mechanical process that removes surface material and contaminants formed or deposited during processing, leaving clean, bright and uniform base material. Alloy selection coupled with surface preparation may result in reduced average hydrogen evolution and reduced standard deviation of gas evolution. After shaving or scalping, hydrogen gassing was measured for the alloys by publicly documented methods of gas measurement along with a quick measurement using the Petri dish method, as known in the art, although other methods of measuring gassing may also be employed. Additionally, counterexamples (alloys C26000 and C65100) were also prepared and tested for comparison.

Example 1

Alloy A

A melt was prepared comprising: 0.5%-0.8% Sn; 0.01%-0.05% P; no more than 0.05% Fe; no more than 0.05% Pb; and the balance Cu; all in wt %. The unplated anode made out of alloy A showed a reduced gas formation relative to that of a similarly-tested tin-plated 260 brass, namely 32% of the gas production observed using tin-plated 260 brass.

Example 2

Alloy B

A melt was prepared comprising: 2.5%-3.8% Sn; 0.03%-0.30% P; no more than 0.30% Zn; no more than 0.10% Fe; no more than 0.05% Pb; and the balance Cu; all in wt %. The unplated anode made out of alloy B showed a reduced gas formation relative to that of a similarly-tested tin-plated 260 brass, for example no more than 36% of the gas production observed using tin-plated 260 brass.

Example 3

Alloy C

A melt was prepared comprising: 4.2%-5.8% Sn; 0.03%-0.35% P; no more than 0.30% Zn; no more than 0.10% Fe; no more than 0.05% Pb; and the balance Cu all in wt %. The unplated anode made out of alloy C showed a reduced gas formation relative to that of a similarly-tested tin-plated 260 brass, namely 48% of the gas production observed using tin-plated 260 brass.

Example 4

Alloy D

A melt was prepared comprising: 7.1%-10.7% Zn; 0.3%-0.7% Sn; no more than 0.10% Pb; no more than 0.05% Fe; and the balance Cu; all in wt %. The unplated anode made out of alloy D showed a reduced gas formation relative to that of a similarly-tested tin-plated 260 brass, namely 48% of the gas production observed using tin-plated 260 brass.

Example 5

Alloy E

A melt was prepared comprising: 28.3%-31.5% Zn; 0.38%-0.60% Sn; 0.02%-0.05% P; no more than 0.05% Pb; no more than 0.05% Fe; and the balance Cu; all in wt %. The unplated anode made out of alloy E showed a reduced gas formation relative to that of a similarly-tested tin-plated 260 brass, namely 23%-24% of the gas production observed using tin-plated 260 brass.

Example 5

Alloy F

A melt was prepared comprising: 16.4%-19.8% Zn; 0.20%-0.50% Sn; no more than 0.05% Pb; no more than 0.05% Fe; and the balance Cu; all in wt %. The unplated anode made out of alloy F showed a reduced gas formation relative to that of a similarly-tested tin-plated 260 brass, namely 23%-49% of the gas production observed using tin-plated 260 brass.

Example 6

Alloy C26000

A melt was prepared comprising: 29%-30% Zn; no more than 0.0025% Pb; no more than 0.0025% Fe; and the balance Cu; all in wt %. Alloy C26000 is a counterexample. The unplated anode made out of alloy C26000 showed an increased gas formation relative to that of a similarly-tested tin-plated 260 brass, namely 1,393% of the gas production observed using tin-plated 260 brass.

Example 7

Alloy C65100

A melt was prepared comprising: 1.5%-1.9% Si; no more than 0.0025% Pb; no more than 0.5% Zn; no more than 0.7% Mn; and the balance Cu; all in wt %. Alloy C65100 is a counterexample. The unplated anode made out of alloy C65100 showed an increased gas formation relative to that of a similarly-tested tin-plated 260 brass, namely 236% of the gas production observed using tin-plated 260 brass.

It is understood that the disclosure may embody other specific forms without departing from the spirit or central characteristics thereof. The disclosure of aspects and embodiments, therefore, are to be considered as illustrative and not restrictive. While specific embodiments have been illustrated and described, other modifications may be made without significantly departing from the spirit of the invention.

What is claimed is:
1. An alkaline battery comprising:
a cathode;
an alkaline electrolyte; and
a copper-based anode which reduces hydrogen gassing without a protective coating or plating to less than 50% of the gas production observed using tin-plated 260 brass, wherein the anode comprises no more than 0.5% Pb, 0.1% to 5.0% tin, 1.0% to 40% zinc, no more than 1% phosphorous, no more than 1% of incidental elements and impurities, and the balance copper, in wt %.

* * * * *